US010220585B2

(12) United States Patent
Marchini et al.

(10) Patent No.: US 10,220,585 B2
(45) Date of Patent: Mar. 5, 2019

(54) PROCESS AND APPARATUS FOR APPLYING LABELS TO TYRES FOR VEHICLE WHEELS

(71) Applicant: PIRELLI TYRE S.P.A., Milan (IT)

(72) Inventors: Maurizio Marchini, Milan (IT); Marco Fabbretti, Milan (IT); Stefano Boracco, Milan (IT); Graziano Fregolent, Farra di Soligo (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 15/766,362

(22) PCT Filed: Oct. 24, 2016

(86) PCT No.: PCT/IB2016/056381
§ 371 (c)(1),
(2) Date: Apr. 5, 2018

(87) PCT Pub. No.: WO2017/072645
PCT Pub. Date: May 4, 2017

(65) Prior Publication Data
US 2018/0290413 A1 Oct. 11, 2018

(30) Foreign Application Priority Data
Oct. 30, 2015 (IT) ........................ 102015000067631

(51) Int. Cl.
*B29D 30/72* (2006.01)
*B29D 30/00* (2006.01)

(52) U.S. Cl.
CPC ......... *B29D 30/72* (2013.01); *B29D 30/0061* (2013.01); *B29D 2030/726* (2013.01)

(58) Field of Classification Search
USPC ....... 156/249, 277, 284, 387, 391, 537, 538, 156/574
See application file for complete search history.

(56) References Cited

U.S. PATENT DOCUMENTS 4,700,078 A * 10/1987 Mizuno ................ G06K 7/1092
235/454
4,725,327 A * 2/1988 Matuda ................... B65C 1/021
156/351

(Continued)

FOREIGN PATENT DOCUMENTS

| JP | H07329945 A | 12/1995 |
| KR | 20120050730 A | 5/2012 |

(Continued)

OTHER PUBLICATIONS

International Search Report and Written Opinion for International Application No. PCT/IB2016/056381 filed Oct. 24, 2016 on behalf of Pirelli Tyre S.P.A. dated Mar. 10, 2017. 9 pages.

*Primary Examiner* — Sing P Chan
(74) *Attorney, Agent, or Firm* — Steinfl + Bruno LLP

(57) ABSTRACT

A process and an apparatus for labelling tires for vehicle wheels. The apparatus includes an application head with a support surface for a label to be applied, at least one label holder feeder and movement devices connected to the application head. The movement devices are configured for moving the application head between the label holder feeder for picking up a label, and an application zone of the label to a green tire. The apparatus further includes a guide device located at the application zone. The guide device includes a guide extending along a predefined path and a support movable along the guide.

30 Claims, 10 Drawing Sheets

(56) References Cited

U.S. PATENT DOCUMENTS

| | | | | |
|---|---|---|---|---|
| 6,230,780 B1* | 5/2001 | Rietheimer | ............ | B65C 11/006 156/541 |
| 6,499,980 B1* | 12/2002 | Fledderjohann | ..... | B29D 30/005 414/222.01 |
| 7,232,498 B2* | 6/2007 | Zimmer | ................ | B29D 30/72 152/523 |
| 7,344,614 B2* | 3/2008 | Yovichin | ............ | B29D 30/1657 156/117 |
| 8,037,916 B2* | 10/2011 | Symens | .................... | B65C 9/46 156/247 |
| 8,088,481 B2* | 1/2012 | Tabata | .................... | B60C 19/00 428/343 |
| 10,011,384 B2* | 7/2018 | Albeniz Garcia-Falces | ................ | B65C 9/26 |
| 2004/0089400 A1* | 5/2004 | Vargo | ................ | B29C 47/0019 156/136 |
| 2005/0274269 A1* | 12/2005 | Nishimoto | ......... | B29D 30/0061 101/288 |
| 2006/0032569 A1* | 2/2006 | Zimmer | ................ | B29D 30/72 152/524 |
| 2006/0090831 A1* | 5/2006 | Yovichin | ............ | B29D 30/1657 152/526 |
| 2007/0295447 A1* | 12/2007 | Symens | ................ | B65C 9/1884 156/277 |
| 2008/0020203 A1* | 1/2008 | Tabata | .................... | B60C 19/00 428/343 |
| 2009/0322480 A1* | 12/2009 | Benedict | .......... | G06K 19/07749 340/10.1 |
| 2012/0085477 A1* | 4/2012 | Donckels | ............... | B29D 30/16 152/556 |
| 2014/0231024 A1* | 8/2014 | Eidelberg | ............ | B29D 30/1635 156/397 |
| 2016/0264282 A1* | 9/2016 | Albeniz Garcia-Falces | ................ | B65C 9/26 |

FOREIGN PATENT DOCUMENTS

| | | | | |
|---|---|---|---|---|
| WO | 2004/056659 A1 | 7/2004 | | |
| WO | WO-2017072645 A1 * | 5/2017 | ......... | B29D 30/0061 |

* cited by examiner

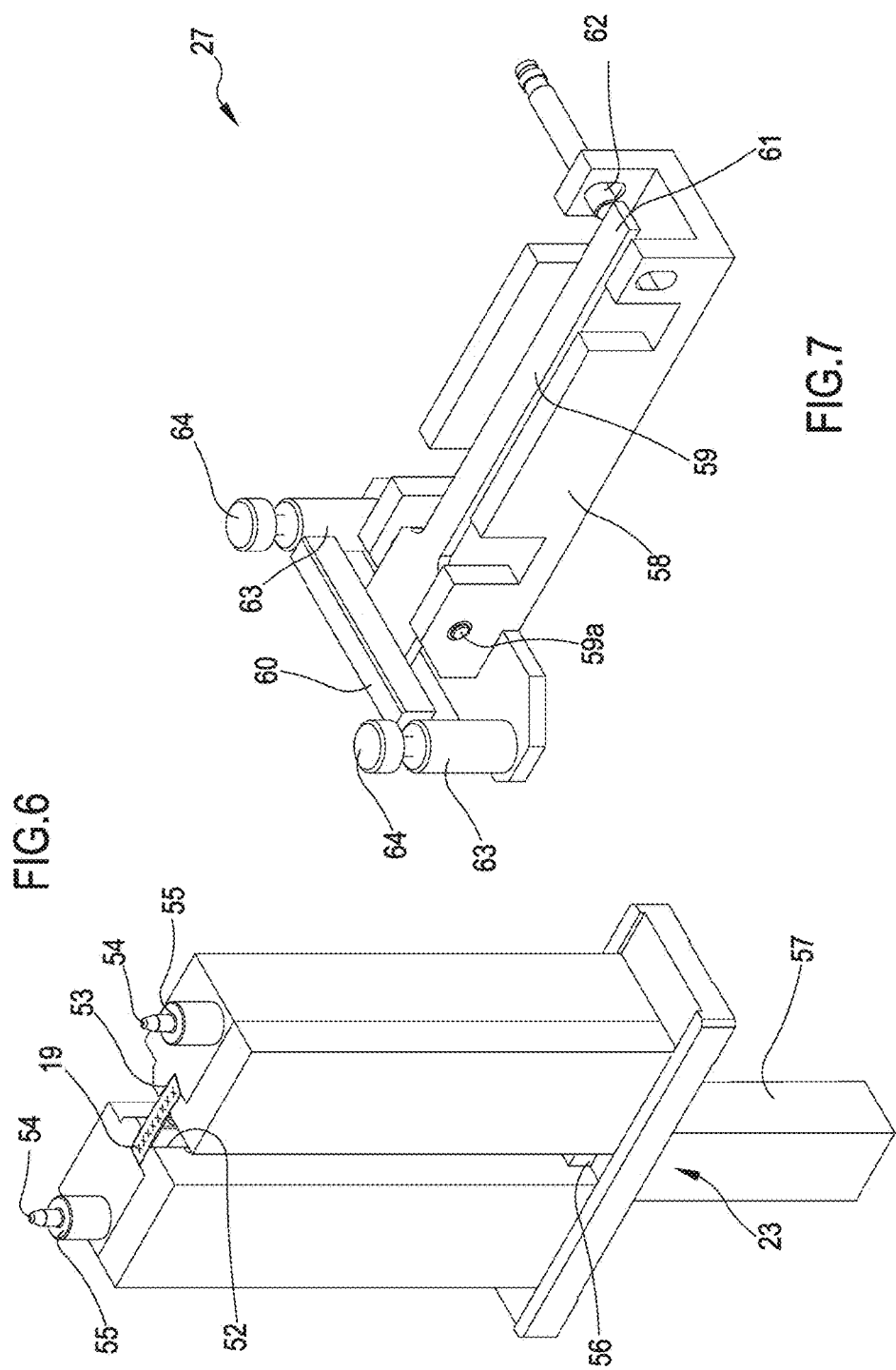

PROCESS AND APPARATUS FOR APPLYING LABELS TO TYRES FOR VEHICLE WHEELS

CROSS-REFERENCE TO RELATED APPLICATIONS

The present application is the U.S. national stage of International Patent Application PCT/IB2016/056381 filed on Oct. 24, 2016 which, in turn, claims priority to Italian application 102015000067631 filed on Oct. 30, 2015.

FIELD OF THE INVENTION

The object of the present invention is a process and an apparatus for labelling tyres for vehicle wheels in a process for building tyres for vehicle wheels. In particular, in the context of said process and apparatus, the present invention preferably but not exclusively relates to the application of labels on green tyres.

BACKGROUND OF THE INVENTION

A tyre for vehicle wheels generally comprises a carcass structure comprising at least one carcass ply having axially opposite end flaps engaged with respective annular anchoring structures. A belt structure is associated in a radially outer position to the carcass structure, comprising one or more belt layers, arranged in radial superposition with respect to each other and with respect to the carcass ply, having textile or metallic reinforcing cords with crossed orientation and/or substantially parallel to the circumferential development direction of the tyre. A tread band is applied in a position radially outer to the belt structure, also made of elastomeric material like other semi-finished products making up the tyre. Respective sides of elastomeric material are further applied on the lateral surfaces of the carcass structure, each extending from one of the lateral edges of the tread band up at the respective annular anchoring structure to the beads. In "tubeless" tyres, the carcass ply is internally coated by a preferably butyl-based layer of elastomeric material, usually called "liner" having optimal airtight characteristics and extending from one to the other of the beads.

The term "elastomeric material" is meant to denote a composition comprising at least one elastomeric polymer and at least one reinforcement filler. Preferably, such composition further comprises additives such as, for example, a cross-linking agent and/or a plasticizer. Due to the presence of the cross-linking agent, such material can be cross-linked by heating, so as to form the final manufactured article.

By label or product label it is meant a label usually made of elastomeric material bearing digits, abbreviations, drawings, whether or not coloured, that is applied on a sidewall of the green tyre, is intended to be vulcanised together with the tyre and to remain on the tyre during the operating life of the latter.

The devices generally used for the application of labels on green tyres may include an application head designed to receive and retain a label to be applied on the tyre. The application head is generally supported by electromechanical systems that are designed to move the head itself between a label feeder and the tyre on which the label is applied.

Document KR20120050730 describes a device for applying a bar code on green tyres. The device comprises a suction head which picks up the bar code from a feeding tray and retains it. The device comprises a pneumatic cylinder, a vertical movement unit and a horizontal movement unit. The pneumatic cylinder allows the head to move back and forth. The vertical movement unit allows the pneumatic cylinder to move upwards or downwards on recirculating ball screws. The horizontal movement unit allows to the recirculating ball screws to move horizontally in opposite and alternating directions by means of a belt.

SUMMARY

Within this context, the Applicant has felt the need to improve the quality of tyres produced with particular reference to the finishing of the sidewalls and the positioning accuracy of the labels on the sidewalls themselves.

In particular, the Applicant has observed that the application systems of the type described above do not allow handling the labels—in particular product labels—with the desired positioning accuracy and repeatability.

The Applicant has in fact observed that the product labels must be applied in predefined positions such as not to interfere with other codes and wording (such as brand, model, diameter, section ratio, rim diameter, load and speed index, etc.) present on the sidewalls of the tyre and which may be imprinted during moulding and vulcanisation, and/or with a possible bar code, applied prior to the vulcanisation.

The Applicant has further observed that the electromechanical systems that support and move the application heads intended to carry and apply the labels to the tyre are inherently little accurate.

In such systems, in fact, during the application of the label to the tyre sidewall, the application head is supported and pressed against the side by the same electromechanical devices in charge of moving the same between a label feeder, the tyre and any other stations dedicated to other functions. Such systems possess more degrees of freedom, i.e. are movable along more directions and/or about multiple axes.

The Applicant has noticed that the errors relating to each degree of freedom can add up, thereby resulting in an overall positioning error of the application head with respect to the tyre which is transformed into a positioning error of the label on the tyre sidewall.

Moreover, the Applicant has observed that the electromechanical movement systems are capable of generating generally limited forces, often insufficient to ensure a complete and permanent adhesion of the label to the tyre sidewall.

Within this context, the Applicant has felt the need to improve the accuracy, reliability and repeatability of the application of the label to the tyre without compromising the flexibility of the device dedicated to this purpose.

The Applicant has perceived that, by controlling the movement of the application head more accurately during the approach step of the same head to the tyre sidewall and in that of application of the label to the sidewall itself, it is possible to achieve the objects indicated above.

In particular, the Applicant has found that by removably associating the application head to a dedicated guide device, during the step of application of the label to the tyre, the accuracy, reliability and repeatability of the movement and positioning of the label can be significantly increased.

More specifically, according to one aspect thereof, the present invention relates to an apparatus for labelling tyres for vehicle wheels.

The apparatus comprises: at least one application head having a support surface for a label to be applied; at least one label-holder feeder; movement devices connected to said at least one application head and configured for moving the application head at least between the label-holder feeder and an application zone of said label to a green tyre.

Preferably, the apparatus comprises a guide device located at the application zone.

Preferably, the guide device comprises: a guide extending along a predefined path; a support movable along the guide.

Preferably, the support is operatively couplable to the application head in a removable manner in order to conduct it along the predefined path, at least during the application of the label to the green tyre.

According to a different aspect thereof, the present invention relates to a process for applying labels to tyres for vehicle wheels.

The process comprises: arranging a green tyre in an application zone; picking up a label from a label-holder feeder and by means of an application head; carrying, by means of movement devices, the application head bearing the label to a guide device located in proximity to the application zone.

Preferably, the process includes connecting the application head to a support of the guide device.

Preferably, the process includes conducting the support, the application head integral therewith and bearing the label onto a guide towards the green tyre until said label is applied.

According to a different aspect thereof, the present invention relates to an apparatus for building green tyres for vehicle wheels, comprising: building devices for building a green tyre; at least one apparatus according to the present invention arranged downstream of said building devices.

According to a different aspect, the present invention relates to a plant for building tyres for vehicle wheels, comprising a building apparatus according to the present invention and at least one moulding and vulcanisation unit operatively arranged downstream of the building apparatus, wherein said at least one apparatus for labelling tyres is operatively arranged upstream of said at least one moulding and vulcanisation unit.

According to a different aspect thereof, the present invention relates to a process for building green tyres for vehicle wheels, comprising: forming components of a green tyre on a forming drum; labelling the green tyre according to the process of the present invention.

The Applicant believes that the present invention can improve the positioning repeatability of the label on the tyre.

The Applicant also believes that the present invention ensures greater system flexibility as there are essentially no limits on the number and type of labels to be applied.

The Applicant further believes that the present invention allows saving space.

The Applicant believes that the present invention allows a reduction in costs.

The present invention, in at least one of the above aspects thereof, can exhibit one or more of the following preferred features.

Preferably, the apparatus for labelling tyres comprises a base, more preferably a single base.

Preferably, the movement devices with the application head, said at least one feeder and the guide device are installed on said base.

The apparatus is therefore compact and can be easily placed, thus making the apparatus and plant layout simpler.

Preferably, the guide comprises at least one rail and the support comprises a sliding block slidably coupled to the rail.

Preferably, the guide is linear, i.e. the rail is straight. The linear guide ensures a precise trajectory.

Preferably, the guide is rested on and anchored to a surface of the base.

Preferably, said surface is horizontal.

Such structure is compact, rigid and sturdy and allows guiding the application head with extreme accuracy and repeatability.

Preferably, wherein the guide device comprises a main actuator operatively connected to the support in order to move said support along the guide at least during the application of the label to the green tyre.

Preferably, the support is mobile between an advanced position and a retracted position. In the advanced position, the connection device protrudes further from the base than in the retracted position. In the retracted position, the connection device is alongside the base or arranged on the base.

Preferably, the main actuator is dedicated to the guide device and is independent from the movement devices.

Preferably, the main actuator is of linear type; for example, the main actuator is a pneumatic or hydraulic cylinder.

Preferably, the main actuator is configured for pushing the support and the application head integral therewith towards the tyre during the application of the label.

Preferably, the main actuator is able to exercise a maximum force of between about 10 kg and about 20 kg, more preferably equal to about 15 kg.

The main actuator carries out the application function and ensures proper and adjustable thrust force of the label against the tyre.

Preferably, the application head comprises abutment elements. Preferably, the connection device comprises reference elements.

Preferably, the reference elements are couplable to the abutment elements of the application head when said application head is on the support.

Due to the abutment elements and the reference elements, the position of the application head on the support is always the same.

Preferably, the abutment elements and/or the reference elements comprise pins and/or seats, wherein the pins are insertable in the seats.

Such structure is mechanically simple and therefore reliable.

Preferably, the reference elements of the connection device comprise a reference surface for the application head and at least one fixed reference pin, preferably a pair of fixed reference pins, emerging from said reference surface. Preferably, said reference surface is horizontal.

Preferably, the abutment elements of the application head comprise an abutment surface substantially orthogonal to the support surface and at least one abutment seat, preferably a pair of abutment seats, configured for receiving the reference pin of the connection device.

The fixed reference pin(s) prevents/prevent displacements of the application head with respect to the support in the reference surface.

Preferably, the reference elements of the connection device comprise at least one connection pin substantially orthogonal to the reference pins. Preferably the connection pin extends substantially parallel to the reference surface.

Preferably, the abutment elements of the application head comprise a connection seat arranged on a lateral surface of said application head and configured for receiving the connection pin of the connection device.

The connection pin prevents the vertical displacements of the application head with respect to the support.

Preferably, the connection pin is movable between an engagement position in the connection seat of the application head and a disengagement position from the application head.

Preferably, the connection device comprises an auxiliary actuator operatively connected to the connection pin for moving it between the engagement position and the disengagement position.

The application head can be coupled and released automatically to/from the support.

Preferably, the label-holder feeder comprises respective reference elements couplable with the abutment elements of the application head when said application head is carried by the movement devices to said label-holder feeder for picking up a label.

In this way, also the relative position between the application head and the feeder is always the same during the pick up and the label position on the support surface of the head is precise and repeatable. In fact, in order to obtain a precise and repeatable label application position, it is necessary to ensure an accurate and repeatable position of label pick up from the feeder.

Preferably, the reference elements of the feeder comprise a pair of reference pins.

Preferably, the abutment elements of the application head comprise auxiliary abutment seats located at the side of the support surface.

Preferably, the reference pins of the feeder are insertable in said auxiliary abutment seats.

Preferably, the label-holder feeder has a housing configured for accommodating a label stack.

Preferably, the housing has an opening which can be reached from the support surface of the application head. Preferably, said opening faces upwards.

Preferably, the reference elements of the label-holder feeder are located at the sides of the housing opening.

Preferably, the label-holder feeder comprises a movable wall operatively connected to a respective actuator, preferably electric, and configured for pushing the label stack towards the opening so as to present a first label in the stack at said opening.

Preferably, the apparatus for labelling tyres comprises a control station configured for verifying that the support surface carries a single label picked up from the label-holder feeder. In fact, the labels, particularly of raw rubber, tend to stick to one another. The control station serves for detecting the presence of two or more labels on the support surface.

Preferably, the movement devices are configured to carry the application head in the control station.

Preferably, the control station comprises respective reference elements couplable with the abutment elements of the application head when said application head is carried by the movement devices in the control station.

Due to the abutment elements and the reference elements, the relative position between the application head and the control station is also always the same during said check.

Preferably, the reference elements of the control station comprise at least one reference surface.

Preferably, the abutment elements of the application head comprise at least one auxiliary abutment surface located at the side of the support surface. Preferably, said at least one reference surface is configured to contact said at least one auxiliary abutment surface.

Preferably, the control station comprises an arm pivoting about a respective pin.

Preferably, the control station comprises a verification surface located on a first end of the pivoting arm.

Preferably, the control station comprises a fixed position sensor located in the proximity of second end of the pivoting arm placed on the side opposite the pin.

Preferably, a first distance between the pin and the first end of the pivoting arm is smaller than a second distance between the pin and the second end of the pivoting arm to ensure a displacement of the second end easily detectable by the position sensor.

Preferably, said at least one reference surface is located at the side of the verification surface.

Preferably, when said at least one auxiliary abutment surface of the application head lies in contact with said at least one reference surface of the control station, the support surface is facing the verification surface.

Preferably, if the support surface carries a single label, said single label remains spaced or only slightly touches the verification surface, and if the support surface carries more than one label, the label pushes against the verification surface, thereby causing the rotation of the pivoting arm detected by the position sensor.

The control system is substantially of mechanical type and is reliable and accurate.

The structure of the control station described above and in the following detailed description and shown in the accompanying drawings may be implemented also on apparatuses for labelling tyres of a different type and be the object of an independent invention in a divisional patent application.

Preferably, the control station is also mounted on the base.

Preferably, the apparatus comprises a film removal station configured for removing a protection film lying on the label prior to the application to the green tyre. The protection film separates one label from the other when the labels are stacked in the feeder.

Preferably, the movement devices are configured to carry the application head in the film removal station.

Preferably, the film removal station comprises respective reference elements couplable with the abutment elements of the application head when said application head is carried by the movement devices in the film removal station.

Due to the abutment elements and the reference elements, the relative position between the application head and the film removal station is also always the same during the removal of the protection film.

Preferably, the reference elements of the film removal station comprise reference pins.

Preferably, the reference elements of the film removal station are fixed.

Preferably, the abutment elements of the application head comprise auxiliary abutment seats located at the side of the support surface.

Preferably, the reference pins of the film removal station are insertable in said auxiliary abutment seats.

Preferably, the film removal station comprises film pick-up devices.

Preferably, the film pick-up devices comprise suction cups and/or mouths in fluid communication with suction devices.

Preferably, when the reference elements of the film removal station are coupled with the abutment elements of the application head, the support surface is facing towards the pick-up devices.

Preferably, the pick-up devices are movable between a pick-up position, in which they lie next to the reference elements for facing towards the support surface of the application head and removing the film, and a release position in which they are displaced, preferably rotated, with respect to the pick-up position for releasing the removed film.

Preferably, a respective actuator, preferably pneumatic, controls the movement of the pick-up devices.

Preferably, blowing devices are in fluid communication with said suction cups and/or mouths for releasing the removed film when the pick-up devices are in the release position.

The structure of the film removal station described above and in the following detailed description and shown in the accompanying drawings may be implemented also on apparatuses for labelling tyres of a different type.

Preferably, the film removal station is also mounted on the base.

Preferably, the apparatus comprises a heating station configured for heating the label carried by the support surface and facilitating the detachment of the film in the film removal station.

Preferably, the movement devices are configured to carry the application head in the heating station.

Preferably, the heating station comprises a heated plate which can be coupled to the support surface. The movement devices place the label carried by the support surface on the heated plate. The heat effect decreases the adhesion between the film and the label, thereby allowing the downstream film removal station easily removing the film from the label.

Preferably, the heating station comprises an elastic support for the heated plate. In other words, the heated plate is mounted on a vertically spring-loaded structure to ensure the possibility of giving a minimum of interference between the label and the plate itself.

The structure of the heating station described above and in the following detailed description and shown in the accompanying drawings may be implemented also on apparatuses for labelling tyres of a different type.

Preferably, the heating station is also mounted on the base, preferably next to the film removal station.

Preferably, the movement devices comprise an anthropomorphic robot arm.

Preferably, the anthropomorphic robot arm carries said application head at a distal end thereof.

Preferably, the anthropomorphic robot arm is of the multi-axis type, such as six-axis.

Preferably, the label-holder feeder(s), the guide device, the possible control station, the possible film removal station and the possible heating station are located around the anthropomorphic robot arm.

The anthropomorphic robot arm allows quickly and easily reaching all points of the apparatus and moving the application head at the various stations (label-holder feeder(s), guide device, control station, film removal station, heating station).

The anthropomorphic robot arm can be quickly re-programmed to change the access sequence to the various stations and/or if the positions of said stations are changed.

Preferably, the application head comprises a pad.

Preferably, the support surface is defined on said pad.

Preferably, the pad is made of rubber, preferably silicone.

The pad adapts to the shape of the tyre when it is pressed against the same and ensures that the entire label adheres to said tyre during application.

Preferably, the apparatus comprises suction devices and suction ducts connected to the suction devices and opening onto the support surface of the application head, for picking up and retaining the label picked up.

Preferably, the apparatus comprises a control unit configured for controlling the movement devices, said at least one label-holder feeder, the guide device, the possible control station, the possible film removal station and the possible heating station.

Preferably, the control unit is configured for arranging the movement means in idle condition when it controls the guide device, in particular the main actuator, and moves the application head together with the support for applying the label to the green tyre.

During the application itself, the movement devices are turned off and the thrust action is only exerted by the guide device. In this way, only the main actuator must be controlled and this simplifies the management of the apparatus.

Preferably, according to the method of the invention, the application head and the label are pressed against the sidewall of the green tyre with a force of between about 10 kg and about 20 kg, preferably equal to about 15 Kg. This force ensures the adhesion of the label to the tyre.

Preferably, when the application head is coupled to the support, abutment elements of the application head are coupled to reference elements of the guide device.

Preferably, during the movement towards the sidewall, the application head remains connected to the movement devices.

Preferably, the movement of the support towards the sidewall of the green tyre is operated by a main actuator independently of the movement devices.

Preferably, the movement devices are arranged in idle condition during the movement of the support towards the sidewall.

Preferably, the movement of the support towards the sidewall is straight.

Preferably, during the pick-up from the label-holder feeder, abutment elements of the application head are coupled to reference elements of the label-holder feeder.

Preferably, before coupling the application head to the support and by means of the movement devices, the application head bearing the label is moved into a control station.

Preferably, the control station is configured for verifying that the support surface carries a single label picked up from the label-holder feeder.

Preferably, during the verification, abutment elements of the application head are coupled to reference elements of the control station.

Preferably, before coupling the application head to the support and by means of the movement devices, the application head bearing the label is moved into a film removal station.

Preferably, it is contemplated to remove a protection film lying on the label.

Preferably, during the removal, abutment elements of the application head are coupled to reference elements of the film removal station.

Preferably, the film removal is carried out by suction.

Preferably, before moving the application head with the label into the film removal station, it is contemplated to move the application head with the label, by means of the movement devices, into a heating station.

Preferably, the label carried by the support surface is heated for facilitating the detachment of the film in the film removal station.

Preferably, the label is picked up and retained on one support surface of the application head by suction.

Preferably, the label is made of elastomeric material.

The label is a product label which is applied on the sidewall of the tyre and then vulcanised together with the tyre.

Preferably, the tyre in the application zone is arranged on a forming drum.

Preferably, the forming drum is positioned and supported by a support device, preferably a main anthropomorphic robot arm.

Further features and advantages will become more apparent from the detailed description of a preferred but non-exclusive embodiment of an apparatus for labelling tyres for vehicle wheel in a plant for building tyres for vehicle wheels according to the present invention.

DESCRIPTION OF THE DRAWINGS

Such description is given hereinafter with reference to the accompanying drawings, provided only for illustrative and, therefore, non-limiting purposes, in which:

FIG. 6 shows a different element of the apparatus in FIGS. 2, 3 and 4;

FIG. 7 shows a different element of the apparatus in FIGS. 2, 3 and 4;

DETAILED DESCRIPTION

Figure 1:
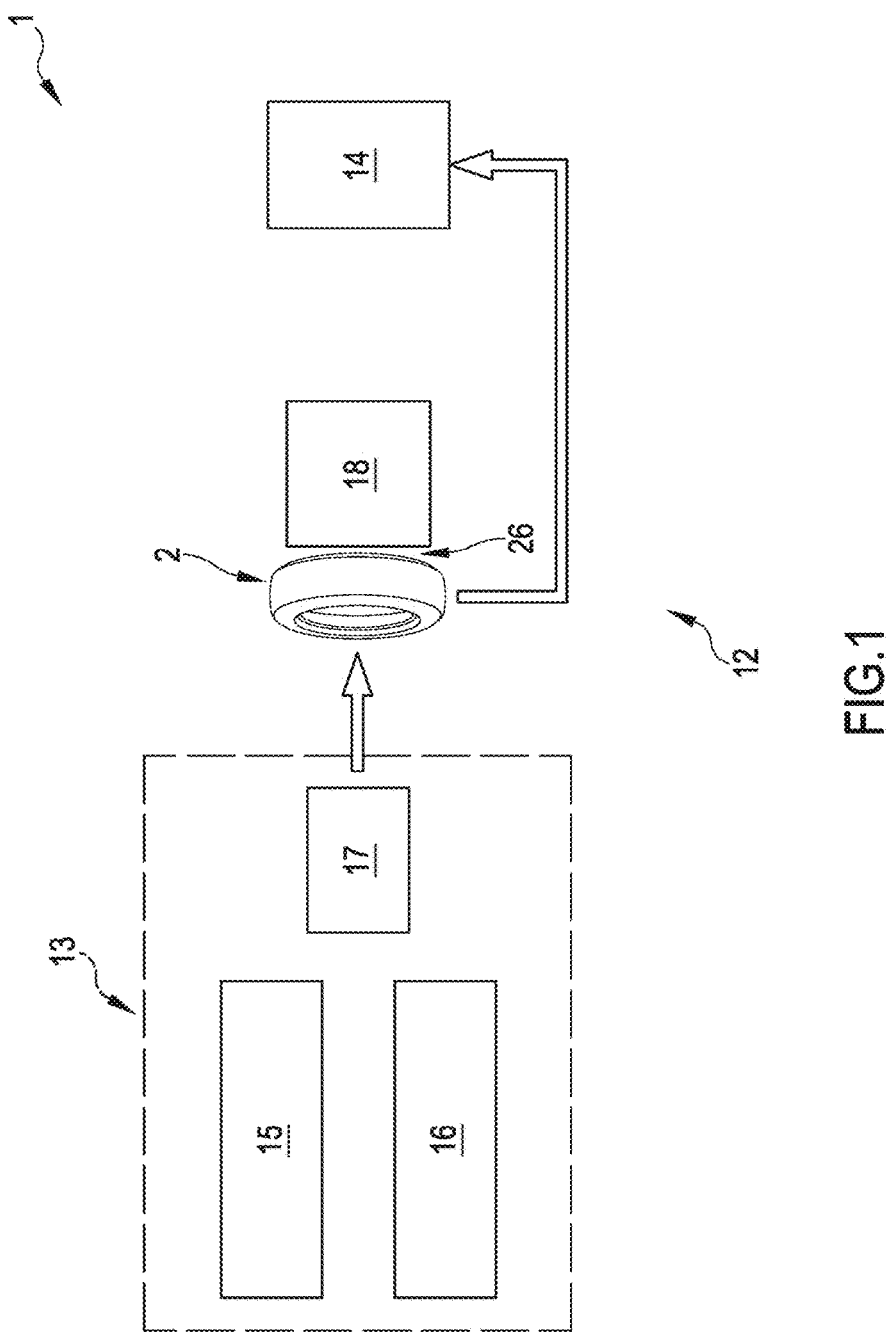
FIG. 1 schematically shows a plant for building tyres for vehicle wheels comprising an apparatus for labelling tyres according to the present invention.

With reference to FIG. 1, reference numeral 1 identifies as a whole a plant for building tyres 2 for vehicle wheels.

Figure 10:
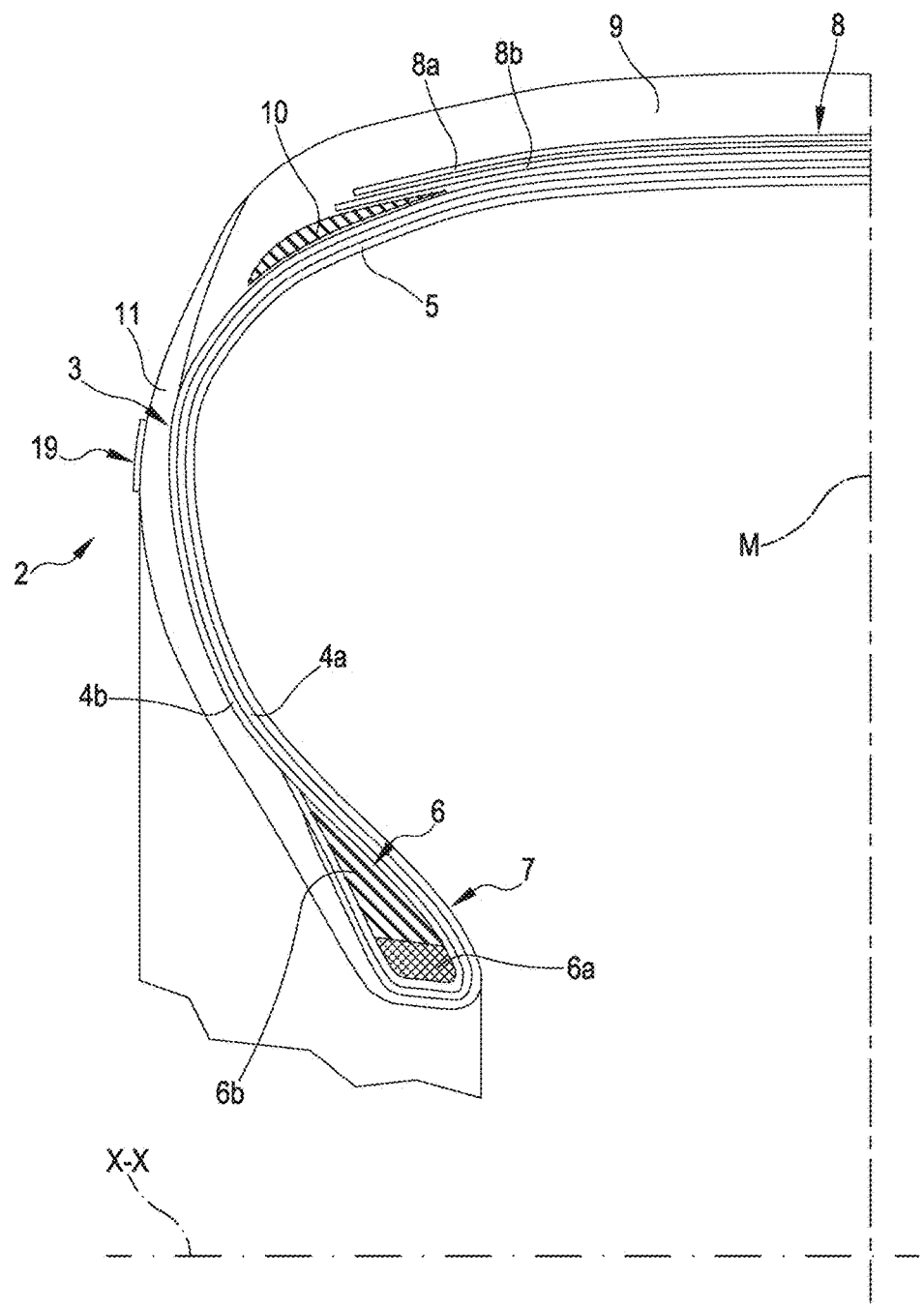
FIG. 10 shows a radial half-section of a tyre built with the plant in FIG. 1.

A tyre 2, built in said plant 1, is shown in FIG. 10 and essentially comprises a carcass structure 3 having two carcass plies 4a, 4b. An airtight layer of elastomeric material or so-called liner 5 is applied internally to the carcass ply/plies 4a, 4b. Two annular anchoring structures 6 comprising each a so-called bead core 6a bearing an elastomeric filler 6b in radially outer position are engaged to respective end flaps of the carcass ply or plies 4a, 4b. The annular anchoring structures 6 are integrated in the proximity of zones usually identified by the name of "beads" 7, at which the engagement between tyre 2 and a respective mounting rim usually occurs. A belt structure 8 comprising belt layers 8a, 8b is circumferentially applied around the carcass ply/plies 4a, 4b, and a tread band 9 is circumferentially over-lapped to the belt structure 8. The belt structure 8 can be associated with so-called "under-belt inserts" 10 placed each between the carcass ply/plies 4a, 4b and one of the axially opposite end edges of the belt structure 8. Two sidewalls 11, extending each from the respective bead 7 to a corresponding lateral edge of the tread band 9, are applied in laterally opposite positions on the carcass plies 4a, 4b. The portion comprised between the radially outer portion of each sidewall 11 and the axially outer portion of the tread band 9 is known as tyre shoulder.

Plant 1 shown in FIG. 1 comprises a production line 12 of tyres 2 consisting of a building apparatus 13 of green tyres and at least one moulding and vulcanisation unit 14 operatively arranged downstream of the building apparatus 13.

In the non-limiting embodiment of plant 1 shown in FIG. 1, the building apparatus 13 comprises a carcass building line 15 at which forming drums, not shown, are moved between different stations of dispensing semi-finished products designed to form, on each building drum, a carcass sleeve comprising the carcass plies 4a, 4b, liner 5, the annular anchoring structures and possibly at least part of sidewalls 11.

At the same time, in an outer sleeve building line 16, one or more auxiliary drums, not shown, are sequentially moved between different work stations designed to form an outer sleeve on each auxiliary drum, comprising at least the belt structure 8, the tread band 9, and possibly at least part of sidewalls 11.

The building apparatus 13 further comprises an assembling station 17 at which the outer sleeve is coupled to the carcass sleeve.

In other embodiments of plant 1, not shown, the building apparatus 13 may be of different type, for example designed to form all of the above components on a single drum by means of building devices.

The built tyres 2 are finally transferred to the moulding and vulcanisation unit 14.

Figure 11:
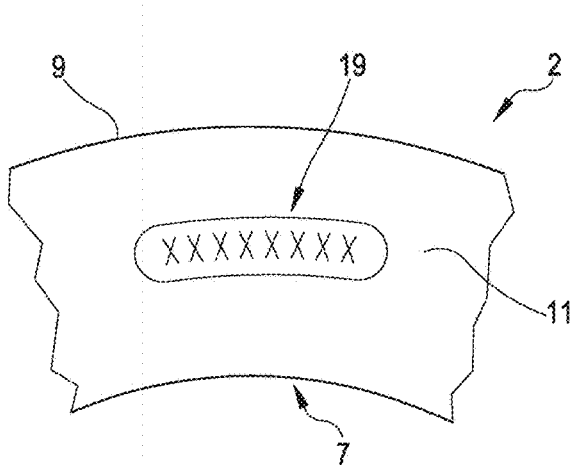
FIG. 11 shows a partial side view of the tyre in FIG. 10.

As shown in FIG. 1, an apparatus 18 for labelling tyres is operatively interposed between the assembling station 17 and the moulding and vulcanisation unit 14 and is configured for applying a label 19 to a sidewall 11 of the green tyre 2 (FIGS. 10 and 11). Label 19 is a so-called product label, or a label of elastomeric material bearing digits, abbreviations, drawings, whether or not coloured, which is applied to sidewall 11 of the green tyre 2. Such a label 19 is intended to be vulcanised together with tyre 2 and to remain on tyre 2 during the operating life of the latter.

Apparatus 18 comprises a main anthropomorphic robot arm 20 (shown in FIG. 2) configured for supporting thereon a forming drum carrying tyre 2 coming from the assembling station 17.

Apparatus 18 comprises a base 21 intended to rest on the ground. At an upper portion thereof, base 21 carries an anthropomorphic robot arm 22 around which the following are arranged: a first label-holder feeder 23 and a second label-holder feeder 24 for respective types of labels 19, a guide device 25 located at an application zone 26. The application zone 26 (FIGS. 1 and 2) is the place where one of sidewalls 11 of tyre 2 is placed for receiving label 19. Base 21 further carries: a control station 27, a film removal station 28 and a heating station 29, which are also arranged next to the anthropomorphic robot arm 22.

Figure 4:
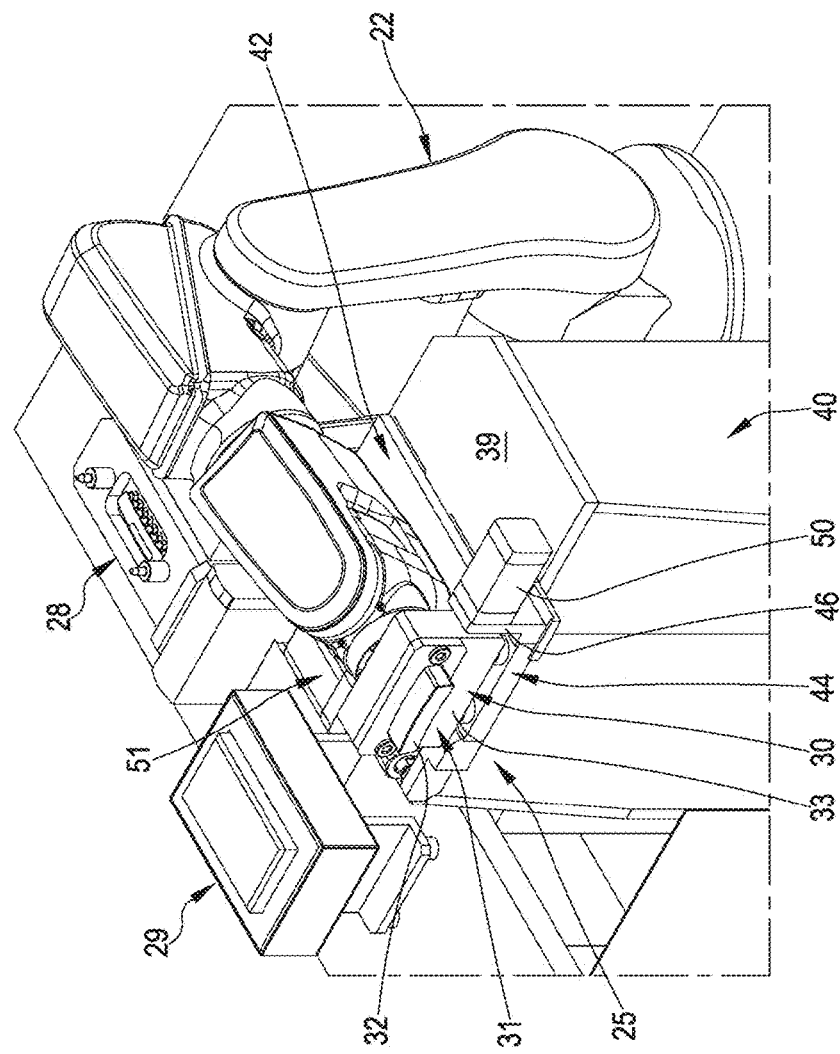
FIG. 4 shows an enlarged perspective portion of the apparatus in FIGS. 2 and 3.

The anthropomorphic robot arm 22 may be of the type having six axes. A base of the anthropomorphic robot arm 22 is supported by and anchored to base 21. A distal end of the anthropomorphic robot arm 22 carries an application head 30 (FIGS. 4, 4A and 4B).

The anthropomorphic robot arm 22 forms movement devices connected to the application head 30 and configured for moving the above application head 30 between the label-holder feeder 23, the second label-holder feeder 24, the application zone 26, the station control 27, the film removal station 28 and the heating station 29.

The application head 30 carries a pad 31, such as of silicone rubber, which has a support surface 32 intended to receive and retain a label 19 to then apply it to tyre 2. Pad 31 and the support surface 32 have a shape suitable for receiving different labels but of similar shape and size. Pad 31 may be replaced, either manually or automatically, with another of different shape and size in order to allow the management of labels 19 even of very different types.

Figure 4A:
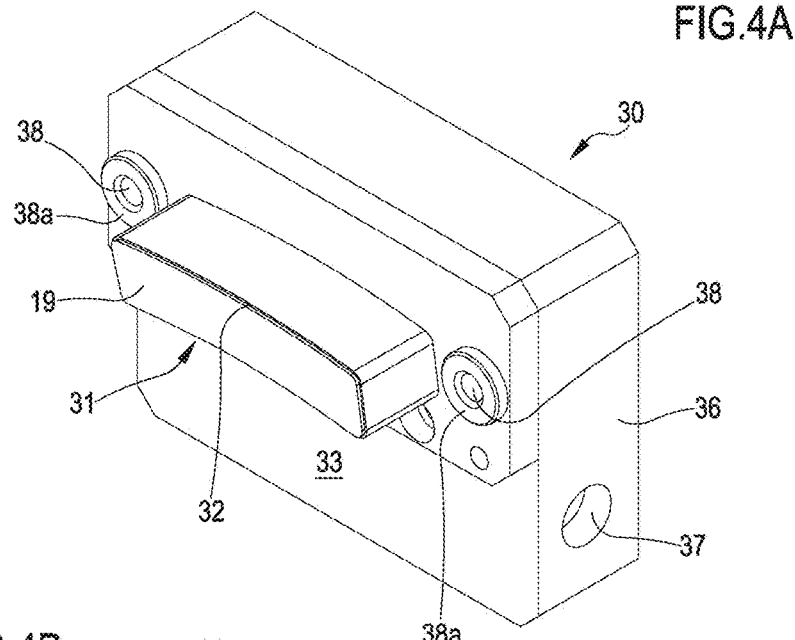
FIGS. 4A and 4B show respective perspective views of an element of the apparatus in FIGS. 2, 3 and 4.
Figure 4B:
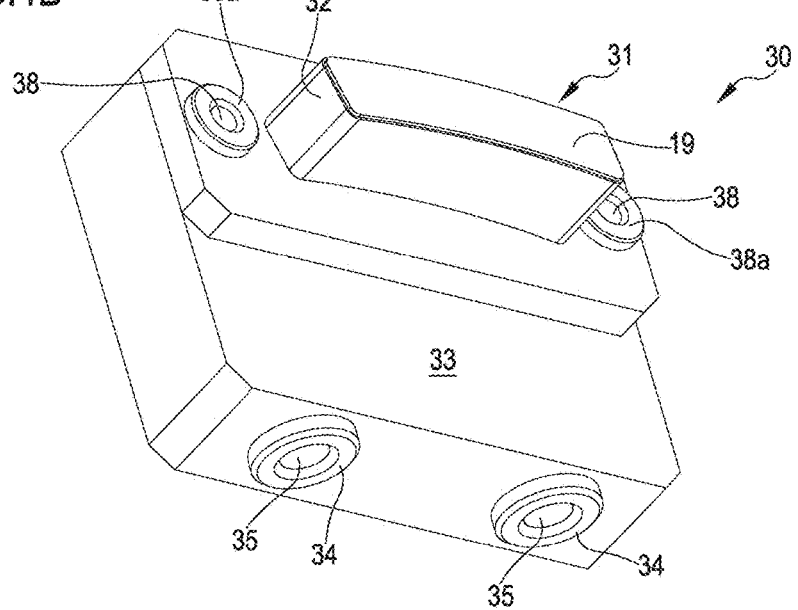

As shown in FIGS. 4A and 4B, the application head 30 comprises a parallelepiped body provided with a front side 33 on which pad 31 is arranged, a rear side opposite the front side 33 and connected to the end of the anthropomorphic robot arm 22, and lateral sides orthogonal to the front side 33 and to the support surface 32.

One of said lateral sides carries an abutment surface 34 substantially orthogonal to the support surface 32 and has a pair of abutment seats 35, each defined by a hole. As shown in FIG. 4B, the abutment surface 34 is defined by two annular surfaces, each surrounding one of the abutment seats 35.

A different lateral side 36, perpendicular to the abutment surface 34, has a connection seat 37 defined by a respective hole.

Moreover, the front side 33 has, at the sides of pad 32, two auxiliary abutment seats 38 defined by as many holes. Two annular surfaces, each surrounding one of the auxiliary abutment seats 38, together define an auxiliary abutment surface 38a.

The abutment surface 34, the abutment seats 35, the auxiliary abutment surface 38a, the auxiliary abutment seats 38 and the connection seat 37 form abutment elements of the application head 30.

The application head 30 further has inner suction ducts, not shown, communicating with suction ducts formed in pad 31 and opening onto the support surface 32. Such suction ducts are in fluid communication with suction devices, not shown, of apparatus 18. The suction action provided by the suction devices allows picking and retaining a label on pad 31, as will be described further hereinafter.

The guide device 25 is positioned on a horizontal surface 39 belonging to a frame 40 carried by base 21. Surface 39 is placed in an elevated position with respect to the base of the anthropomorphic robot arm 22.

Figure 5:
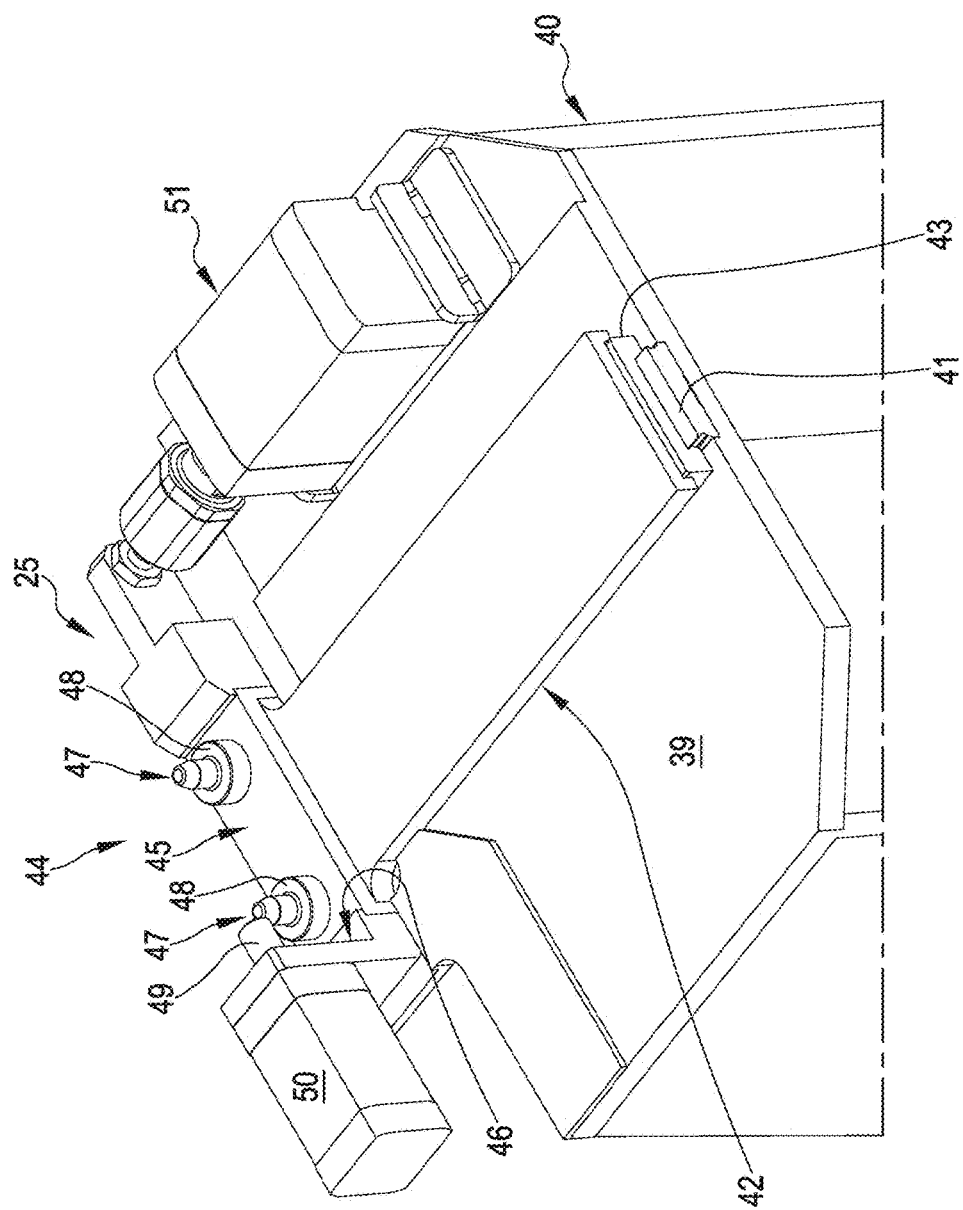
FIG. 5 shows a detail of the apparatus in FIGS. 2, 3 and 4 with some parts removed to better highlight others.
Figure 8:
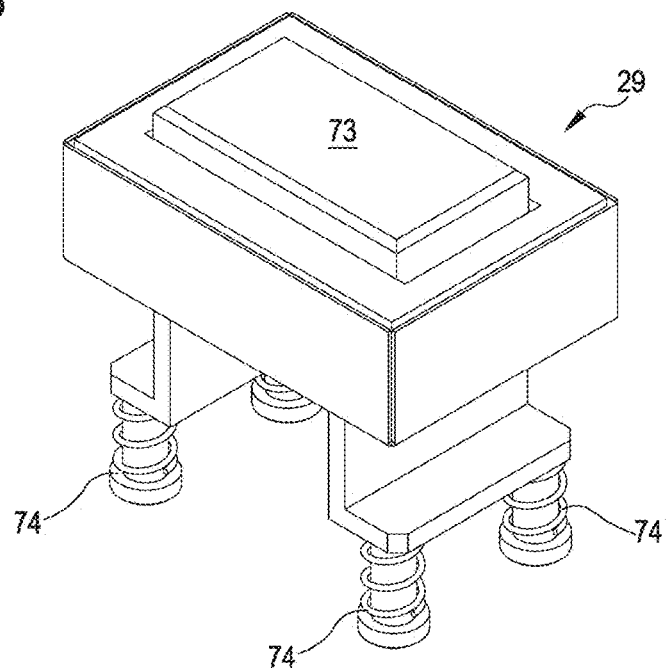
FIG. 8 shows a further different element of the apparatus in FIGS. 2, 3 and 4.

The guide device 25 comprises (FIG. 5) a guide 41 defined by a rail supported by and anchored to surface 39 and extending along a predefined and rectilinear path.

A support 42 comprises a sliding block 43 slidably coupled to the rail. Support 42 is therefore linearly movable on the rail. In particular, support 42 comprises an elongated plate jointed to the sliding block 43.

At one end thereof projecting from surface 39, the elongated plate has a connection device 44 which can be operatively coupled to the applicator head 30 for removably engaging said application head 30 to support 42 and moving it together with support 42 during the application of label 19 to tyre 2.

The connection device 44 comprises a substantially L-shaped element having a substantially horizontal element 45 and an appendage 46 orthogonal to the substantially horizontal element 45.

The substantially horizontal element 45 carries a pair of fixed reference pins 47 emerging orthogonally from said substantially horizontal element 45. An annular surface parallel to the substantially horizontal element 45 and spaced from a surface of said substantially horizontal element 45 surrounds each pin 47 at the base. The two annular surfaces together define a reference surface 48 for the application head 30.

A connection pin 49 orthogonal to the reference pins 47 and parallel to the reference surface 48 extends from appendage 46. The connection pin 49 is moved, by means of an auxiliary actuator 50 mounted on appendage 46 itself, between an extracted position and a retracted position.

The reference pins 47, the reference surface 48 and the connection pin 49 form reference elements of the connection device 44.

While the connection pin 49 is in the retracted position (position of disengagement from the application head 30), the application head 30 is carried on the connection device 44 by the anthropomorphic robot arm 22 so as to insert the fixed reference pins 47 in the abutment seats 35 and rest the abutment surface 34 of the application head 30 on the reference surface 48 of the connection device 44. The fixed reference pin 47 prevents displacements of the application head 30 with respect to support 42 in the reference surface 48.

The auxiliary actuator 50 moves the connection pin 49 to the extracted position, thereby causing the engagement thereof in the connection seat 37 of the application head 30. The connection pin 49 prevents the vertical displacements of the application head 30 with respect to support 42.

The application head 30 is coupled and released automatically to/from support 42. Due to the abutment elements 34, 35, 37 and the reference elements 47, 48, 49, the position of the application head 30 on support 42 is always the same.

On the opposite side with respect to appendage 46, the substantially horizontal element 45 carries an auxiliary appendage connected to a main linear actuator 51 defined by a pneumatic cylinder. The main actuator 51 is mounted on frame 40 and extends and acts along a direction parallel to guide 41. In particular, an actuator body 51 is firmly constrained to frame 40 and the end of a rod of actuator 51 is constrained to said auxiliary appendage.

The main actuator 51 is independent of the movement devices which are instead defined by the anthropomorphic robot arm 22.

The main actuator 51 is configured for moving support 42 along guide 41 between an advanced position and a retracted position. In the retracted position, the connection device 44 is alongside frame 40 of base 21. In the advanced position, the connection device 44 protrudes further from frame 40 of base 21 than in the retracted position. The stroke of support 42 in the movement between the advanced position and the retracted position is for example comprised between about 50 mm and about 150 mm.

In the embodiment shown, the main actuator 51 is configured for pushing the connection device 44 from the retracted position towards the advanced position and for pulling the connection device 44 from the advanced position towards the retracted position. The main actuator 51 is therefore configured for pushing support 42 and the application head 30 integral therewith towards tyre 2 during the application of label 19. The main actuator 51 is sized for exerting a pushing force of about 15 Kg.

Each of the first label-holder feeder 23 and second label-holder feeder 24 has a similar structure shown in FIG. 6. Only the first feeder 23 will therefore be described.

The first feeder 23 has the shape of a column inside which a housing 52 configured for accommodating a stack of labels 19 is formed. Housing 52 develops as a sort of duct along the entire column.

A base of the column is constrained to base 21. One end of the column, opposite to the base, has an opening 53 of housing 52 facing upwards.

At the sides of opening 53, the column has two reference pins 54 that extend upwards. Two annular surfaces located at the base of each of the reference pins 55 and around each of the reference pins 54 together define, similar to what was done by pins 47 of the connection device 44, a reference surface 55 for the application head 30. The reference pins 54 and the reference surface 55 form reference elements of the first feeder 23. The reference pins 54 of the first feeder 23 are configured for being inserted in the auxiliary abutment seats 38 of the application head 30 while the reference surface 55 of the feeder abuts against the auxiliary abutment surface 38a of the application head 30.

A movable wall 56, partially shown in FIG. 6, is inserted into housing 52 and is operatively connected to a respective electric actuator 57. The movable wall 52 may be translated, by means of the electric actuator 57, along housing 52 and is configured for pushing the stack of labels 19 towards opening 53 so as to present a first label 19 of the stack at said opening 53.

The control station 27 is configured for verifying that the support surface 32 carries a single label 19 picked from the first or second label-holder feeder 23, 24. In other words, the control station 27 serves for detecting the undesired presence of two or more labels 19 on the support surface 32.

The control station 27 comprises (FIG. 7) a base structure 58 constrained to base 21. The base structure 58 carries a pivoting arm 59 about a respective horizontal pin 59a. A first end of the pivoting arm 59 placed at a first distance from pin 59a carries a verification surface 60. A second end 61 of the pivoting arm 59, opposite the first end and placed at a second distance from pin 59a, is placed at a position sensor 62 fixed with respect to the base structure 58. The second distance is for example about five or six times greater than the first distance.

The control station 27 has, at the sides of the verification surface 60, two projections 63 integral with the base structure 58 and bearing circular surfaces at their ends jointly defining a reference surface 64 of the control station 27. The reference surface 64 of the control station 27 is configured for coming into contact with the auxiliary abutment surface 38a of the application head 30. Said reference surface 64 of the control station 27 therefore defines reference elements which can be coupled with the abutment elements of the application head 30 when said application head 30 lies in the control station 27.

In detail, the application head 30 carrying a label 19 picked from the first or second label-holder feeder 23, 24 is carried by the anthropomorphic robot arm 22 above the control station 27 with the support surface 32 and label 19 facing the verification surface 60. The application head 30 is approached to the control station 27 up to bring the reference surface 64 of the control station 27 in mutual contact with the auxiliary abutment surface 38a of the application head 30, or the circular surfaces of projections 63 with the annular surfaces surrounding the auxiliary abutment seats 38.

If the support surface 32 actually carries a single label 19, such a single label 19 remains spaced or only slightly touches the verification surface 60 whereby the pivoting arm for 59 remains stationary, i.e. does not pivot. If instead the support surface 32 carries more than one label 19, the thickness of labels 19 is such that the outermost label pushes against the verification surface 60, thereby causing the rotation of the pivoting arm 59 and the displacement of the second end 61 which is detected by the position sensor 62.

The film removal station 28 is configured for removing a protection film lying on label 19 before the application to tyre 2. The protection films separate one label 19 from the other when labels 19 are stacked in the respective label-holder feeder 23, 24.

Figure 9:
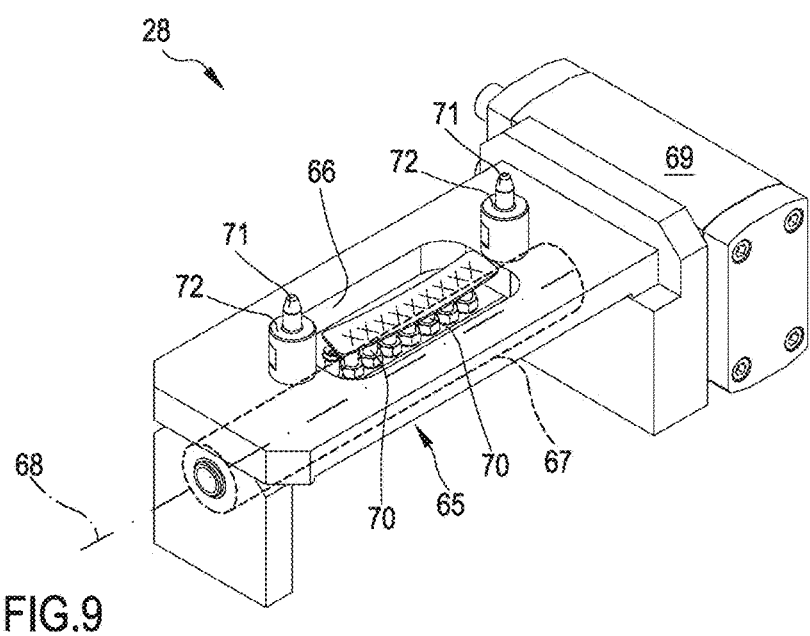
FIG. 9 shows a further different element of the apparatus in FIGS. 2, 3 and 4.

The film removal station (FIG. 9) comprises a support 65 fixed to base 21. Support 65 is shaped as a bridge and has a top plate provided with a window 66. A duct 67 is arranged underneath the top plate which is rotatable about a respective axis of rotation 68 as controlled by a pneumatic actuator 69. The rotatable duct 67 has a tubular shape and comprises a plurality of suction mouths 70 in fluid communication with suction/blowing devices, not shown. The rotatable duct 67 is movable about the axis of rotation is 68 between a 19 film pick-up position, in which the suction mouths 70 face into window 66, and a film release position, in which the suction mouths 70 are facing sideways or downwards. The suction mouths 70 and the suction/blowing devices form film 19 pick-up devices.

At the sides of window 66, the top plate bears reference pins 71 extending upwards and which are fixed with respect to support 65. An annular surface surrounds each pin 71 at the base. The two annular surfaces together define a reference surface 72 of the film removal station 28. The reference pins 71 and the reference surface 72 define reference elements which can be coupled with the abutment elements of the application head 30, particularly with the auxiliary abutment seats 38 and with the auxiliary abutment surface 38a, when said application head 30 is brought by the anthropomorphic robot arm 22 into the film removal station 28. The reference pins 71 of the film removal station 28 can be inserted into the auxiliary abutment seats 38 and the reference plane 72 can be abutted against the auxiliary abutment surface 38a.

When the reference elements 71, 72 of the film removal station 28 are coupled with the abutment elements 38, 38a of the application head 30 and the suction mouths 70 are in the film 19 picking position, the support surface 32 faces towards the pick-up devices 70 which, through suction, retain film 28. In the release position, the suction mouths 70 blow away the film 19 previously removed from the support surface 32, depositing it in a dedicated collection container (not shown).

The heating station 29 is configured for heating label 19 carried by the support surface 32 and thus facilitating the detachment of film 19 in the film removal station 28 described above. The application head 30 therefore carries the picked film 19 into the heating station 29 first, and then into the film removal station 28.

The heating station 29 is mounted next to the film removal station 28.

The heating station 29 comprises a plate 73 heated by means of electrical resistances operatively coupled to said heated plate 73 and not shown. The heated plate 73 is mounted on base 21 by means of elastic supports 74 (springs) so as to partly yield when the application head 30 rests against it and ensure uniform contact of the carried label 19 with plate 73 itself.

Figure 2:
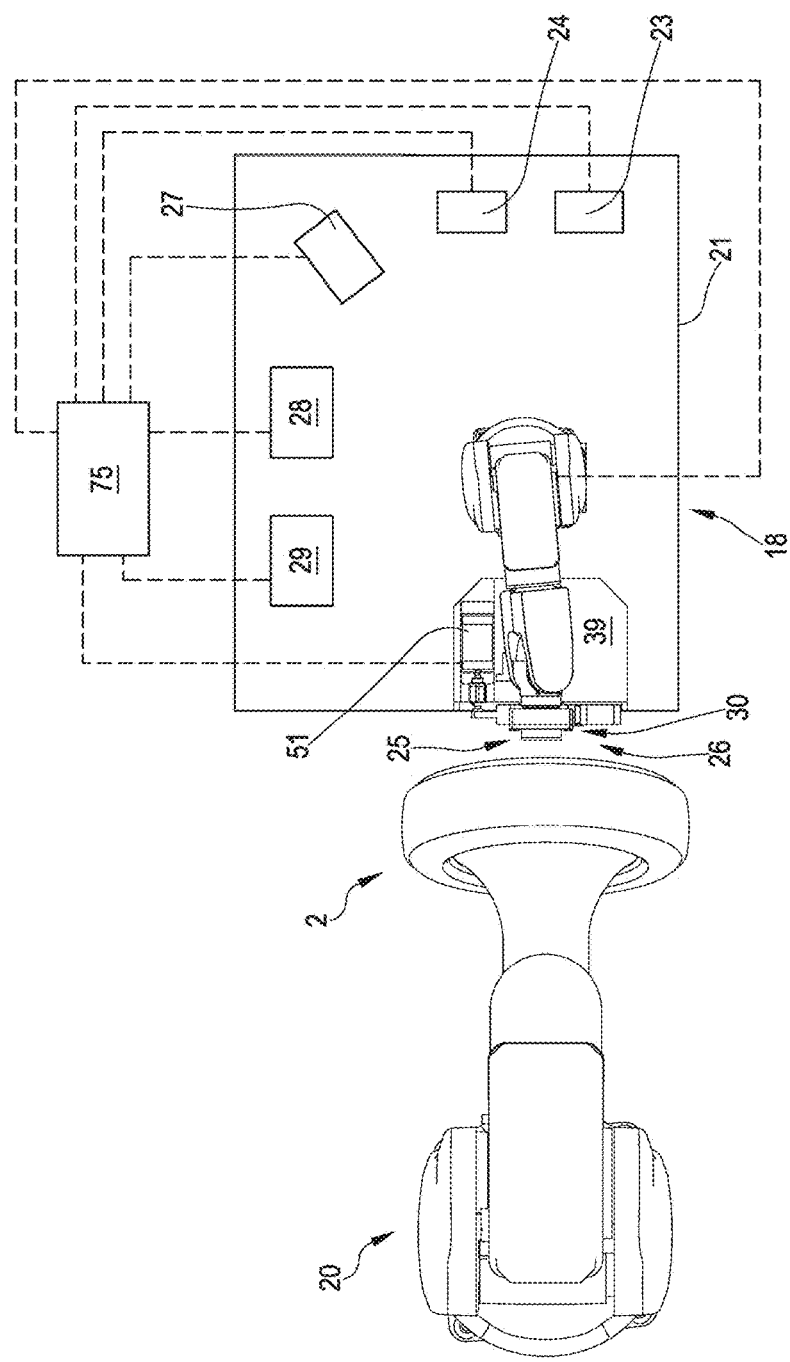
FIG. 2 shows an enlarged top view of the apparatus in FIG. 1 associated with a tyre to be labelled.
Figure 3:
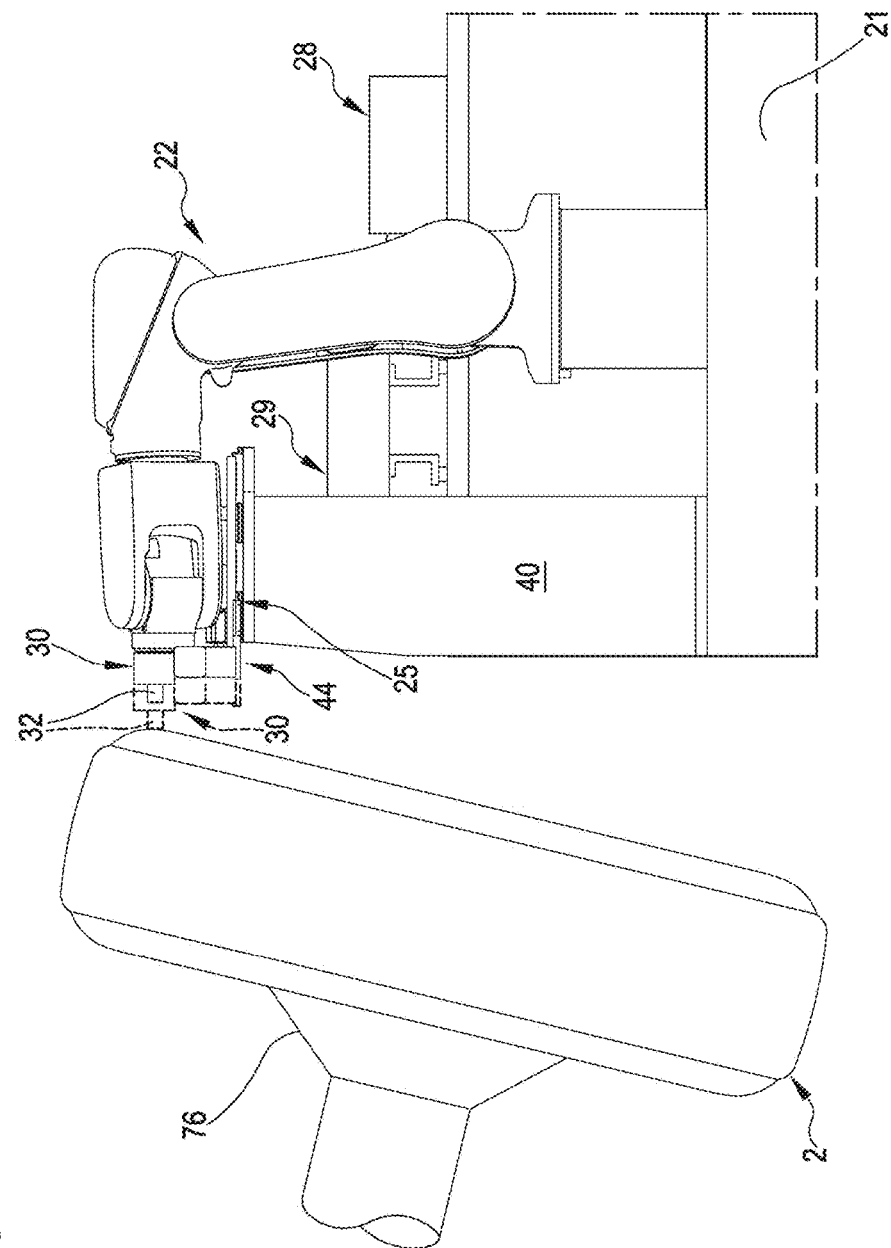
FIG. 3 shows a side elevation view of the apparatus in FIG. 2 in two operating positions.

A control unit 75, schematically shown in FIG. 2, is configured for controlling the anthropomorphic robot arm 22, the first and the second label-holder feeder 23, 24, the guide device 25, the control station 27, the film removal station 28 and the heating station 29. The operation of apparatus 18 can be programmed through the control unit 75, provided with appropriate input and output devices (keyboard, display, etc.). For example, the anthropomorphic robot arm 22 can be re-programmed to change the access sequence to the various stations and/or if the positions of said stations are changed.

In use, according to the process of the present invention, a green tyre 2 built in the building apparatus 13 is picked up from the main anthropomorphic robot arm 20 and brought to the application zone 26. In particular, the main anthropomorphic robot arm 20 bears a moulding drum 76 around which the green tyre 2 is placed. The main anthropomorphic robot arm 20 also correctly positions tyre 2 in front of the guide device 25, so that the portion of sidewall 11 is that intended to receive label 19, and keeps it fixed in such position (FIG. 2). The control of the main anthropomorphic robot arm 20 is operated by a control unit, not shown, of the building apparatus 13 and/or by the control unit 18 of apparatus 75 which is operatively connected to the control unit of the building apparatus 13.

Figure 12:
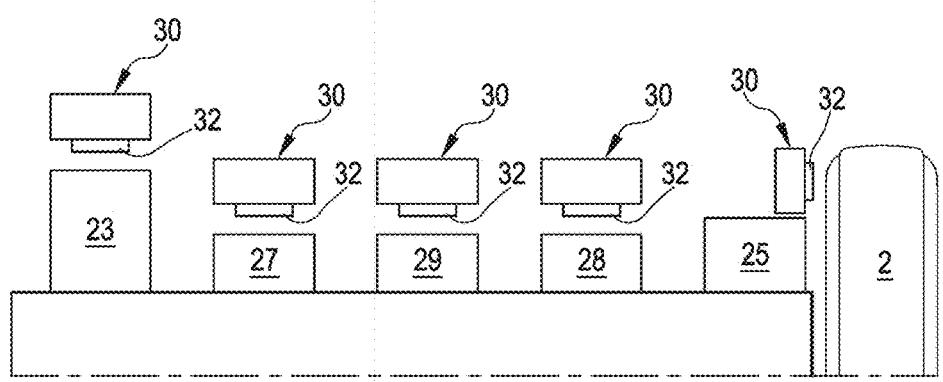
FIG. 12 schematically shows in a sequence the path of the element in FIGS. 4A and 4B in the apparatus in FIGS. 2, 3 and 4.

The anthropomorphic robot arm 22, controlled by the control unit 75 of apparatus 18, brings the application head 30 into the different stations as schematically shown in FIG. 12.

The anthropomorphic robot arm 22 brings the application head 30 above the first or second feeder 23, 24 (the one containing the correct type of label 19 for the tyre 2 to be labelled) and couples the auxiliary abutment seats 38 and the auxiliary abutment surface 38a of the application head 30 with the reference pins 54 of feeder 23, 24 and the reference surface 55 of feeder 23, 24. Thereafter, actuator 57 of feeder 23, 24 lifts the movable wall 56 and the stack of labels 19 so as to bring the top label 19, placed at opening 53 of feeder 23, 24, against the support surface 32. The activation of the suction devices of the application head 30 causes the adhesion of label 19 to the support surface 32. Label 19 adheres to the support surface 32 with a side thereof (the one with digits, abbreviations, drawings) intended then to remain exposed on tyre 2. The opposite side is covered by the film that must be removed.

At this point, the anthropomorphic robot arm 22 removes the application head with 30 together with label 19 picked up from feeder 23, 24 and brings it into the control station 27.

In the control station 27, the anthropomorphic robot arm 22 rests the auxiliary abutment surface 38a of the application head 30 against the reference surface 64 of the control station 27. If the label 19 picked is just one (with the respective film), it does not interfere with the verification surface 60 and sensor 62 does not detect any change in the position of the second end 61.

The anthropomorphic robot arm 30 can thus bring the application head 30 along with label 19 and the film into the heating station 29. The anthropomorphic robot arm 22 rests pad 31 against the heated plate 73. The film comes into contact with the heated plate 73. The heat reduces the adhesion between the film and label 19. The anthropomorphic robot arm 30 then brings the application head 30 together with label 19 and the film into the film removal station 28 and couples the auxiliary abutment seats 38 and the auxiliary abutment surface 38a of the application head 30 with the reference pins 71 and with the reference surface 72 of the film removal station 28. The suction mouths 70 in the film 19 pick-up position are activated so as to suction the film, detach it from label 19 and retain it. The film goes through window 66 and adheres to the suction mouths 70. The rotatable duct 67 is rotated about the respective axis of rotation 68 and, when the suction mouths 70 are in the film release position, the film is blown away by mouths 70 and dropped, for example in a collection container, not shown.

If, on the other hand, the label 19 picked is more than one (with the respective films), they interfere with the verification surface 60 and sensor 62 detects a change in the position of the second end 61. The multiple label 19 is discarded, for example using the same film removal station 28 which picks up and discards labels 19 instead of the film alone.

If label 19 is only one, once deprived of the film, the anthropomorphic robot arm 22 brings the application head 30 together with label 19 into the guide station 25. While support 42 is in the retracted position, the movement of the anthropomorphic robot arm 22 causes of the insertion of the reference pins 47 of the connection device 44 in the abutment seats 35 of the application head 30 and the engagement of the reference surface 48 of the connection device 44 with the abutment surface 34 of the application head 30. The action of the auxiliary actuator 50 causes the insertion of the connection pin 49 in the connection seat 37 of the application head 30 which is therefore locked on the guide device 25.

The control unit 75 arranges the anthropomorphic robot arm 22 (which still remains connected to the application head 30) in the idle condition and controls the main actuator 51. The main actuator 51 pushes support 42 and the application head 30 integral therewith towards tyre 2 up to applying label 19 on sidewall 11 and pressing it against tyre 2 with a force of about 15 kg.

Label 19 adheres to sidewall 11 and the main actuator 51 returns support 42 and the application head 30 to the retracted position. The application head 30 is released from support 42 and the anthropomorphic robot arm 22, activated again, brings the head again at the first or second feeder 23, 24 for a new labelling cycle on another tyre 2.

The labelled tyre 2 is moved, by means of suitable devices not shown, into the moulding and vulcanisation 14 where it is shaped, moulded and vulcanised.

The invention claimed is:

1. A process for applying labels to tyres for vehicle wheels, comprising:
   arranging a green tyre in an application zone;
   picking up a label, from a label-holder feeder and by means of an application head;
   carrying, by means of movement devices, the application head bearing the label to a guide device located in proximity to the application zone;
   connecting the application head to a support of the guide device;
   conveying the support, the application head integral therewith and bearing the label onto a guide towards said green tyre until said label is applied.

2. The process of claim 1, wherein the application head bearing the label is thrust against a sidewall of the green tyre with a force comprised between about 10 kg and about 20 kg.

3. The process of claim 1, wherein, when the application head is connected to the support, abutment elements of the application head are coupled to reference elements of the guide device.

4. The process of claim 1, wherein, during the movement towards the sidewall, the application head remains connected to the movement devices.

5. The process of claim 1, wherein the movement of the support towards the sidewall of the green tyre is operated by a main actuator in a manner independent from the movement devices.

6. The process of claim 1, wherein the movement devices are arranged in idle condition during the movement of the support towards the sidewall.

7. The process of claim 1, wherein during the pick-up from the label-holder feeder, abutment elements of the application head are coupled to reference elements of the label-holder feeder.

8. The process of claim 1, comprising:
carrying, before connecting the application head to the support and by means of the movement devices, the application head bearing the label into a control station;
verifying, in said control station, that the support surface carries a single label picked up from the label-holder feeder;
wherein, during the verification, abutment elements of the application head are coupled to reference elements of the control station.

9. The process of claim 1, comprising:
carrying, before coupling the application head to the support and by means of the movement devices, the application head bearing the label into a film removal station;
removing a protection film lying on the label;
wherein, during the removal, abutment elements of the application head are coupled to reference elements of the film removal station.

10. The process of claim 1, wherein the label is made of elastomeric material.

11. An apparatus for labelling tyres for vehicle wheels, comprising:
at least one application head having a support surface for a label to be applied;
at least one label holder feeder;
movement devices connected to said at least one application head and configured for moving the application head at least between the label holder feeder and an application zone of said label onto a green tyre;
a guide device located at the application zone and comprising:
a guide extended along a predefined path;
a support movable along the guide;
said support being operatively couplable to the application head in a removable manner in order to convey the application head along said predefined path, at least during the application of the label to the green tyre.

12. The apparatus of claim 11, wherein said support comprises a connection device for removably connecting said application head to the support.

13. The apparatus of claim 12, wherein the guide comprises at least one rail and the support comprises a sliding block slidably coupled to the rail.

14. The apparatus of claim 11, wherein the guide is linear.

15. The apparatus of claim 11, wherein the guide device comprises a main actuator operatively connected to the support in order to move said support along the guide at least during the application of the label to the green tyre.

16. The apparatus of claim 11, wherein the application head comprises abutment elements and the connection device comprises reference elements couplable with the abutment elements of the application head when said application head is on the support.

17. The apparatus of claim 16, wherein the abutment elements and/or the reference elements comprise pins and/or seats, wherein the pins are insertable in the seats.

18. The apparatus of claim 16, wherein the reference elements of the connection device comprise a reference surface for the application head and at least one fixed reference pin emerging from said reference surface.

19. The apparatus of claim 18, wherein the abutment elements of the application head comprise an abutment surface substantially orthogonal to the support surface and at least one abutment seat configured for receiving the reference pin of the connection device.

20. The apparatus of claim 16, wherein the reference elements of the connection device comprise at least one connection pin substantially orthogonal to the reference pins.

21. The apparatus of claim 20, wherein the abutment elements of the application head comprise a connection seat arranged on a lateral face of said application head and configured for receiving the connection pin of the connection device.

22. The apparatus of claim 16, wherein the label-holder feeder comprises respective reference elements couplable with the abutment elements of the application head when said application head is carried by the movement devices to said label-holder feeder for picking up a label.

23. The apparatus of claim 22, wherein the reference elements of the feeder comprise a pair of reference pins, wherein the abutment elements of the application head comprise auxiliary abutment seats placed at the side of the support surface, wherein the reference pins of the feeder are insertable in said auxiliary abutment seats.

24. The apparatus of claim 11, comprising a base, wherein the movement devices with the application head, said at least one feeder and the guide device are installed on said base.

25. The apparatus of claim 11, comprising a control station configured for verifying that the support surface carries a single label picked up from the label-holder feeder, wherein the movement devices are configured for carrying the application head into the control station, wherein the control station comprises respective reference elements couplable with the abutment elements of the application head when said application head is carried by the movement devices into the control station.

26. The apparatus of claim 25, wherein the reference elements of the control station comprise at least one reference surface; wherein the abutment elements of the application head comprise at least one auxiliary abutment surface placed at the side of the support surface; wherein said at least one reference surface is configured for coming into contact with said at least one auxiliary abutment surface.

27. The apparatus of claim 11, comprising a film removal station configured for removing a protection film lying on the label before the application to the green tyre, wherein the movement devices are configured for carrying the application head into the film removal station, wherein the film removal station comprises respective reference elements couplable with the abutment elements of the application head when said application head is carried by the movement devices into the film removal station.

28. The apparatus of claim 27, comprising a heating station configured for heating the label carried by the support surface and facilitating the detachment of the film in the film removal station, wherein the movement devices are configured for carrying the application head into the heating station.

29. The apparatus of claim 11, wherein the movement devices comprise an anthropomorphic robot arm, wherein the anthropomorphic robot arm carries said application head at a distal end thereof.

30. The apparatus of claim 11, comprising a control unit configured for driving at least the movement devices, said at least one label-holder feeder and the guide device, wherein the control unit is configured for arranging the movement devices in idle condition when it drives the guide device and moves the application head and the support together in order to apply the label to the green tyre.

* * * * *